United States Patent [19]

Becker et al.

[11] 4,253,969

[45] Mar. 3, 1981

[54] DEPOSIT CONTROL THROUGH THE USE OF OLIGOMERIC PHOSPHONIC ACID DERIVATIVES

[75] Inventors: Larry W. Becker, Wilmington, Del.; Philip S. Davis, Furlong, Pa.; Ian D. Morrison, Webster, N.Y.

[73] Assignee: Betz Laboratories, Inc., Trevose, Pa.

[21] Appl. No.: 57,879

[22] Filed: Jul. 16, 1979

Related U.S. Application Data

[62] Division of Ser. No. 941,536, Sep. 11, 1978, Pat. No. 4,201,669.

[51] Int. Cl.³ .............................................. C02F 5/14
[52] U.S. Cl. ...................................... 210/699; 252/180
[58] Field of Search .......................... 422/15; 260/931; 210/58; 252/180

[56] References Cited

U.S. PATENT DOCUMENTS

| | | | |
|---|---|---|---|
| 3,617,574 | 11/1971 | Maier | 210/58 |
| 3,621,081 | 11/1971 | Prentice | 260/931 X |
| 3,639,292 | 2/1972 | Gilby | 210/58 X |
| 4,190,615 | 2/1980 | Becker | 260/931 |

*Primary Examiner*—Thomas G. Wyse
*Attorney, Agent, or Firm*—Alexander D. Ricci

[57] ABSTRACT

The present disclosure is directed to oligomeric phosphonic acid derivatives which possess excellent chlorine resistance and acceptable calcium tolerance and which, at substoichiometric amounts, inhibit the formation of scale in aqueous mediums. Additionally, the oligomers have been found to be quite active as dispersants for particulate matter contained in an aqueous medium.

13 Claims, No Drawings

DEPOSIT CONTROL THROUGH THE USE OF OLIGOMERIC PHOSPHONIC ACID DERIVATIVES

This application is a division of application Ser. No. 941,536 filed Sept. 11, 1978, now U.S. Pat. No. 4,201,669.

TECHNICAL FIELD

The present invention is directed to aqueous systems such as, but not limited to, cooling water systems, pulp and paper mill systems, boiler water systems and gas scrubber systems where the formation and/or deposition of materials contained therein can and would most likely cause problems because of decreased flow rates, lost energy efficiency, poor quality products or pollution considerations. The problems associated with scale formation and deposition, the deposition of iron compounds, etc. in industrial water systems such as once-through and recirculating cooling water systems are well known in the art and are documented comprehensively in chapters 25 through 27 (pages 178–197) of the *Betz Handbook of Industrial Water Conditioning*, seventh edition, 1976, Betz Laboratories, Inc., Trevose, PA 19047. Similarly, the situation with respect to scale and deposition formation in gas scrubbing operations in the various industries is described in that publication on pages 314 to 327 and the problems associated with pitch in the production of quality paper are described on pages 284 and 285.

For the above-defined applications, certain organophosphonates have been used reasonably effectively to control the scale and deposit problems occurring in cooling water systems, pulp and paper mill systems, boiler systems and scrubber systems. The phosphonates which have been used extensively are amino tri(methylene phosphonic acid), i.e., $N(CH_2PO_3H_2)_3$ or its water soluble salts, commonly referred to in the art as ATMP; diethyltriamine pentamethylene phosphonic acid, whose formula is $[(H_2O_3PCH_2)_2NCH_2CH_2]_2NCH_2PO_3H_2$, commonly known as DPPA; and 1-hydroxyethane-1,1-diphosphonic acid, i.e.,

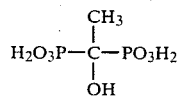

or its water soluble salts, commonly referred to as HEDP.

Applicants noticed during the study of these compounds and compounds closely related thereto that the nitrogen containing phosphonates were quickly degraded when used in systems where the chlorine content was high either naturally or as a consequence of other additives which provide chlorine. It was determined that the chlorine attacked the nitrogen of the compounds with a resultant decrease in their activity. Chlorine is found in many cooling water systems by virtue of the fact that it is commonly used as a microbial control agent. Chlorine is found in many pulp systems because of the hypochlorite pulp bleaching aids utilized. Again, chlorine drastically curtails the advantages of employing any amino containing phosphonates. Because of this, certain arrangements had to be provided for where scale formation or deposit control became a problem in a chlorine-containing environment. One special formulary arrangement led to the use of the earlier described 1-hydroxyethane 1,1-diphosphonic acid or its water soluble salts (HEDP), notably the potassium and sodium or ammonium forms. Since the HEDP compounds do not contain nitrogen, they possessed a greater degree of resistance to chlorine attack and accordingly are utilized quite satisfactorily in a chlorine environment. The HEDP compounds, however, although possessing the desirable chlorine resistance, were found to have their own peculiar problem. It was discovered that when the HEDP was formulated, or when products containing such were diluted, prior to usage, with water containing a relatively high calcium ion concentration, the HEDP compounds, whether in acid form or salt forms, had the tendency to react with the available calcium ion present to form a salt which precipitated and which hindered the efficacy of the HEDP compounds for scale and deposit control purposes. A similar result occurred when HEDP formulations were added to high calcium ion containing waters within a system, e.g., cooling water operating at elevated cycles of concentration, scrubbers using lime and magnesium oxide as additives, pulp and paper systems, boiler systems and evaporator systems, etc. The HEDP reacted with the calcium ions present to form a precipitate which not only reduced the efficacy of the HEDP formulations but increased the cost of treatment. In addition, and equally important, is the fact that with the reaction there existed another potential deposit in the form of the HEDP precipitating calcium salt.

Applicants, once realizing the foregoing problems associated with the use of the two primary phosphonic acid derivatives, embarked on a program to develop a compound which would possess the attendant advantages of those compounds possessing the phosphonic acid or salt group but which did not also have the calcium and chlorine disabilities. Applicants hoped to discover a compound or compounds which had general utility as deposit and scale control agents either as crystallization inhibitors or dispersants and which could be used in every environment regardless of whether it contained chlorine and/or high calcium ion concentration.

DISCLOSURE OF INVENTION

Applicants discovered during their research and developmental effort that compounds of the general formula

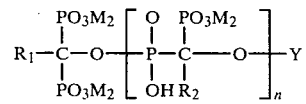

where $R_1$ and $R_2$ each represent a group but not necessarily the same group having the formula $C_xH_{2x+1}$ where x is from 1 up to and including 13; where Y is hydrogen,

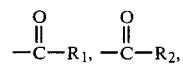

or mixtures thereof; M is a water soluble cation such as Na, K or $NH_4$; and n is 1 or greater so long as the oligomer is water soluble (n from 1 to 16 is preferred); possessed not only the desired chlorine resistance and in most instances calcium tolerance, but also were effective as crystallization inhibitors and dispersants. What was particularly impressive with the compounds was their ability at substoichiometric amounts to inhibit or control the crystallization of such potential scale salts as calcium and/or magnesium phosphates, sulfates and carbonates. Certain of the compounds were also found to be quite suitable at lower dosage levels as dispersants for iron oxides and calcium oleate, the most common ingredient in pulp and paper mill pitch.

The appropriately substituted alkane-1,1-diphosphonic acids needed for this work were prepared by well-documented literature procedures and were dehydrated to the respective ester condensate oligomers by acetic anhydride. The free hydroxyl groups from the oligomerization process are predominately acetylated by the acetic anhydride but can also contain lesser amounts of the elements of the reactant carboxylic acids or acid chlorides as a result of mixed anhydride exchange reactions.

As explained comprehensively in U.S. Pat. No. 3,336,221 which is hereby incorporated by reference, the "threshold" effect, i.e., the ability of a compound at less than stoichiometric amounts to prevent precipitation of scale salts in a scale-forming environment, is significant to the water treatment industry because of economies and the desire to keep the amount of added materials in an aqueous medium to a minimum.

As with the ATMP described by the cited patent, the threshold active compounds of the present invention will control precipitation of the scale-forming salts when added in threshold amounts of up to about 100 parts by weight per million parts of water containing the scale-imparting ions. Preferably they are used at a rate of from about 0.5 to 25 parts per million. In the alternative, the amount of threshold compound may be based upon the scale-forming cation contained in the aqueous medium. If this latter alternative is utilized, threshold inhibition takes place at a weight ratio of the threshold active compound to scale-forming cation component of 1 to 100 up to 1 to 34,000, but preferably from 1 to 200 up to 1 to 4,000. This of course is substantially less than the sequestration requirements which range in weight ratio of the sequestration agent to the scale-forming cation of greater than 10 to 1.

Molecular weight of the oligomers of the present invention does not appear to be critical; accordingly "n" of the formula is expressed as being 1 or greater. The oligomer of the invention where $R_1$ and $R_2$ are methyl is disclosed in Prentice U.S. Pat. No. 3,621,081, with its use as a detergent builder being disclosed and claimed in U.S. Pat. No. 3,562,169.

Detergent builders, according to D. J. Shaw, "Introduction to Colloid and Surface Chemistry", Buttersworth, London, 1966, "fulfill a number of functions, the most important being to sequester (form soluble non-adsorbed complexes) $Ca^{+2}$ and $Mg^{+2}$ ions and act as deflocculating agents, thus helping to avoid scum formation and dirt redeposition." A. W. Adamson, "Physical Chemistry of Surfaces", Intersciences Publishers, New York, 1967, page 497, gives a similar definition for detergent builders. It is important to recognize that these definitions require that, at a minimum, sufficient quantities of builder must be added on a stoichiometric mole basis to sequester the hardness ions. This significantly contrasts with the sub-stoichiometric amounts used in threshold treatment of industrial systems.

A significant number of oligomers were prepared for testing for efficacy, chlorine resistance, and calcium tolerance. However, the Prentice method was only effective in producing the oligomeric derivative where $R_1$ or $R_2$ represented —$CH_3$ and/or —$C_2H_5$. Above —$C_2H_5$ a different method had to be utilized in order to secure isolatable and testable products. When the various homologs were produced and tested, certain peculiarities within the series were observed. For example, the oligomers most easily produced and which were the most effective, the most chlorine-resistant and the most calcium-tolerant were those having "$R_1$" and "$R_2$" groups where x was 1 through and including 3. Above 3 and up to about 5, the oligomers, although generally effective, resistant to chlorine and tolerant of calcium, were not as effective. These comparisons will be more evident from the results which are hereunder recorded in the Tables.

SPECIFIC EMBODIMENTS

The products ultimately tested were produced in accordance with the following Examples. It will be noted that the Products of Examples 2 and 3 were produced utilizing the Prentice procedure. However, because of isolation problems, other procedures were used to prepare the other higher homologs.

EXAMPLE 1—PRODUCT 1

Preparation of the Phosphorous Acid Ester Condensate Oligomer of 1-Hydroxyethane-1,1-Diphosphonic Acid—Phosphorous Trichloride/Acetic Anhydride Method Acetic acid (90.0 g; 1.5 mole) and water (27.0 g; 1.5 mole) were mixed and placed in a "Fleaker" equipped for magnetic stirring. An ice bath was added to cool the mixture while phosphorous trichloride (137.5 g; 1.0 mole) was slowly added. The first few grams caused considerable heat with copious quantities of HCl being evolved. After the water had apparently been consumed, the reaction mixture became endothermic and heating was necessary to maintain HCl evolution. The two-layer mixture was heated to 125° C. where a one-phase melt of phosphonic acid was formed. After 1 hour at this temperature, 250 ml of acetic anhydride was added all at once (exothermic with an immediate solid). After 2 hours at room temperature, the yellow mass was broken, washed with ether and dried in vacuo to give 70 g of product. The product produced had the formula as represented earlier where $R_1$ and $R_2$ were each —$CH_3$ and Y was

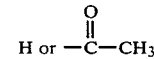

or mixtures thereof.

EXAMPLE 2—PRODUCT 2

Preparation of the Phosphorous Acid Ester Condensate Oligomer from a Mixture of Acetic and Propionic Anhydride A mixture of 250 ml of acetic and 250 ml of propionic anhydride was prepared and heated to 55°–60° C. with 50 g (0.61 mole) of phosphorous acid until white crystals appeared, cooled to room temperature, and stirred for an additional 20 hours. The crystals were filtered, washed with ether and dried as noted in the previous example to give 20 g (31% of theoretical based on a 50/50 mixture of monomer). The product produced had the formula represented earlier where $R_1$ and $R_2$ were $-CH_3/-C_2H_5$ or $-C_2H_5/-CH_3$ and Y was

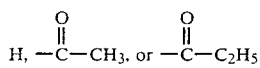

or mixtures thereof.

EXAMPLE 3—PRODUCT 3

Preparation of the Phosphorous Acid Ester Condensate Oligomer of 1-Hydroxypropane-1,1-Diphosphonic Acid from Propionic Anhydride Propionic anhydride (250 ml) and phosphorous acid (25 g; 0.30 mole) were stirred and warmed to 55°–60° C. until a white solid formed (~40 min), at which time the reaction mixture was cooled to room temperature. After stirring overnight, the product was a gummy mass, but after trituration with ether a white product was obtained which was dried in vacuo at 80° C. to give 23 g of tan solid. The product had the formula earlier described where $R_1$ and $R_2$ were $-C_2H_5$ and Y was H,

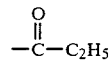

or mixtures thereof.

EXAMPLE 4—PRODUCT 4

Preparation of the Phosphorous Acid Ester Condensate Oligomer of 1-Hydroxybutane-1,1-Diphosphonic Acid—Butyryl Chloride/Acetic Anhydride Method.

Butyryl chloride (53.3 g; 0.5 mole) and phosphorous acid (41 g; 0.5 mole) were slowly heated in a flask with magnetic stirring to 140° C. at which time the melt became very thick. After maintaining this temperature for 1 hour, the mixture was poured into 200 ml of acetic anhydride and warmed to 55°–60° C. for 15 minutes. Upon cooling and adding an additional 200 ml of acetic anhydride a white gummy material formed. Decanting the acetic anhydride and replacing it with fresh material produced a crunchy solid which was allowed to remain in contact with the anhydride for 24 hours. After filtering, washing with ether, and drying in vacuo, 29 g of a tacky solid was obtained. The product produced had the formula earlier described where $R_1$ and $R_2$ were $-C_3H_7$ and Y was H,

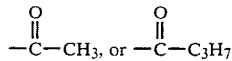

or mixtures thereof.

EXAMPLE 5—PRODUCT 5

Preparation of the Phosphorous Acid Ester Condensate Oligomer of 1-Hydroxyhexane-1,1-Diphosphonic Acid—Hexanoyl Chloride/Acetic Anhydride Method Hexanoyl chloride (63.0 g; 0.47 mole) and phosphorous acid (39.0 g; 0.47 mole) were slowly heated with magnetic stirring. At about 70° C. copious quantities of HCl were evolved and at 135°–140° C., the mixture became milky in color and finally at 140°–145° C. a one-phase thick melt was formed. The temperature rose to 170° C. with no adverse effects. After heating one hour at 150° C., the mixture was added to 250 ml of acetic anhydride. After 2 hours, attempts to separate the product by cooling in an ice bath failed, therefore the excess acetic anhydride was removed on a rotary evaporator to give a dark oil which solidified when dried in vacuo. The dark brown solid weighed 40 g. The product had the earlier described formula where $R_1$ and $R_2$ were $-C_5H_{11}$ and Y was H,

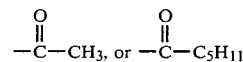

or mixtures thereof.

EXAMPLE 6—PRODUCT 6

Preparation of the Phosphorous Acid Ester Condensate Oligomer of 1-Hydroxyoctane 1,1-Diphosphonic Acid Octanoyl chloride (81.3 g; 0.5 mole) and phosphorous acid (41.0 g; 0.5 mole) were stirred and heated to a one phase melt at 140° C. After ½ hour at 140°–150° C., 30 ml of methanol was added followed by 500 ml of acetic anhydride. After standing ½ hour, the flask was cooled in an ice bath to precipitate a white gummy solid. The supernatant liquid was removed and 200 ml of fresh acetic anhydride was added and allowed to stand overnight. The mixture was cooled again to give a crunchy solid, filtered and dried to give 28 g of light yellow solid. In this instance, $R_1$ and $R_2$ of the earlier described formula were $-C_7H_{15}$ and Y was

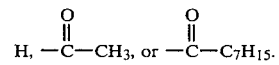

EXAMPLE 7—PRODUCT 7

Preparation of the Phosphorous Acid Ester Condensate Oligomer of 1-Hydroxydecane-1,1-Diphosphonic Acid—Decanoyl Chloride/Acetic Anhydride Method Decanoyl chloride (38.1 g; 0.2 mole) and phosphorous acid (16.4 g; 0.2 mole) were heated with stirring to 140° C. as in previous examples. After 30 minutes at this temperature, the thick melt was poured into 200 ml of acetic anhydride. After 30 minutes at 55°–60° C., the solution was cooled to cause a gummy solid to form. The supernatant liquid was removed and replaced by fresh material. After standing overnight, the solid had dissolved and an ice-bath was again required to cause a gum to form. The acetic anhydride was decanted and ether was added. It also dissolved the product. The ether was removed on a rotary evaporator to give a dark oil which solidified when dried in vacuo. The yield was 15 g (47% of theory based on monomer). $R_1$ and $R_2$ in this instance were $-C_9H_{19}$ and Y was H,

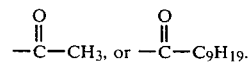

EXAMPLE 8—PRODUCT 8

Preparation of the Phosphorous Acid Ester Condensate Oligomer of 1-Hydroxydodecane-1,1-Diphosphonic Acid—Lauroyl Chloride/Acetic Anhydride Method Phosphorous acid (20.0 g; 0.24 mole) and lauroyl chloride (50.0 g; 0.23 mole) were heated to 120°–140° C. before any HCl was evolved. Upon further heating to 180° C., a one-phase melt was formed. After 1 hour, the melt was treated with 10 ml of methanol followed by 200 ml of acetic anhydride. After cooling to 12° C., a foamy solid had formed at the surface of acetic anhydride. The acetic anhydride was replaced to give a crunchy solid. After standing for 48 hours, the mixture was cooled to 10° C., filtered and dried to give 9 g (11%). $R_1$ and $R_2$ in this instance were —$C_{11}H_{23}$ and Y was H,

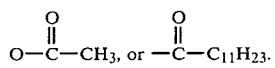

STABILITY TOWARD REACTION WITH CHLORINE

As earlier explained, in many potential applications of the present oligomers, there exists the possibility of their having to function in an oxidative chlorine solution environment (e.g., deposit control application in a chlorinated cooling tower). Consequently, it is important to assess the ability of the oligomers to withstand a chlorine environment. The results of one study for several members of the homologous series, along with other widely utilized raw materials, are shown in Table I. The experimental procedure consists primarily of preparing a solution of each material and sodium hypochlorite and measuring the percent available chlorine (i.e., oxidative chlorine) remaining as a function of time. Any decrease in available chlorine has been interpreted to have been consumed (i.e., reacted) by the other material present. The test procedure utilized was as follows: solutions containing 105 ppm treatment and 105 ppm sodium hypochlorite were maintained at ambient conditions in plastic bottles. The available chlorine was analyzed as a function of time according to TAPPI Standard T-611 OS-47. Decreased values of available chlorine were interpreted to mean reaction with the compounds or oligomers added thereto. The percent available chlorine was calculated as follows:

$$\% \text{ available chlorine} = \frac{\text{ml titrant (treatment present)}}{\text{ml titrant (no treatment)}} \times 100,$$

where ml titrant (no treatment) is proportional to the available chlorine at time=0.

The results in Table I indicated the aminophosphonates (ATMP and DPPA) consumed 75–80 percent of the available chlorine in 16.25 hours whereas most of the oligomers consumed only 12–30 percent. Oligomers where $R_1$ and $R_2$ were $C_2H_5$ and $C_5H_{11}$ consumed 51 and 61 percent respectively in the same time period. At 95 hours the available chlorine was reduced by another factor of 2 for the aminophosphonates whereas for the oligomers the reduction was less than a factor of 2.

In summary, these studies indicated that the oligomeric phosphonates are much less reactive toward, and hence more stable to, chlorine than are the aminophosphonates. This enhanced stability confirms a wider range of applicability for the oligomers.

TABLE I

| STABILITY TOWARD REACTION WITH CHLORINE | | |
|---|---|---|
| | Percent Available Chlorine | |
| Treatment | t = 16.25 hr. | t = 95 hr. |
| None | 100 | 99 |
| Product 1 | 74 | 42 |
| Product 2 | 70 | 57 |
| Product 3 | 49 | 40 |
| Product 4 | 72 | 46 |
| Product 5 | 39 | 20 |
| Product 6 | 88 | 83 |
| Product 7 | NT* | 58 |
| Product 8 | 81 | 70 |
| ATMP | 24 | 12 |
| HEDP | 79 | 77 |
| DPPA | 19 | 9 |

*Not Tested
Conditions:
105 ppm active treatment
105 ppm NaOCl
25° C.

STABILITY TOWARD PRECIPITATION WITH CALCIUM

As previously mentioned, in all anionic aqueous systems containing hardness cations, the potential exists for precipitation with calcium. The formation of a precipitate means, of course, that the previously soluble material has been removed from solution, thus diminishing its ability to function properly where its soluble properties at fixed concentrations are necessary, e.g., adsorption from solution for deposit control or corrosion inhibition.

In order to demonstrate the detrimental effect this precipitation can have in deposit control applications for example, the following experiment was conducted: a 1200 ppm calcium solution was prepared at pH 9 to which 20 ppm HEDP was added. Upon heating, the calcium phosphonate precipitated and was filtered from the solution. The filtrate was then used as a source of HEDP and a sample equivalent to 2 ppm (based upon the original HEDP level) was added to a new solution (No. 1) with a total calcium level of 1200 ppm. A second solution (No. 2) containing 2 ppm HEDP from a stock solution and 1200 ppm calcium was also prepared. Sulfate at 2880 ppm was added to each solution, the pH adjusted to 8, and the solution heated to 100° C. (c.f. Table V). After ten minutes, solution No. 2 had only a slight trace of precipitation, while solution No. 1 had copious amounts of precipitation. The conclusion is that for solution No. 1, HEDP had been sufficiently removed from solution by precipitation that at the residual levels it could no longer function well as a crystallization inhibitor.

Tables II and III show the ability of the oligomeric phosphonates of the invention, along with that of other materials, to withstand various calcium concentrations at two temperatures. The test procedure used to determine calcium tolerance of the materials was as follows: solutions containing 400 ppm $Ca^{+2}$ and 2000 ppm $Ca^{+2}$ were prepared at pH 9. To these, 20 ppm treatment was added and the pH was readjusted to 9 if necessary with NaOH. The solutions were placed in a water bath at 60° C. for 10 minutes. The presence of precipitation was detected by the Tyndall effect.

It is seen that for the oligomers where $R_1$ and $R_2$ are $CH_3$ and $C_3H_7$ (x=1 to 3) at 20 ppm, no precipitate formed even up to 1000 ppm calcium ion and at 60° C. For the oligomer where $R_1$ and $R_2$ were $C_5H_{11}$ (x=5) precipitation occurred. It is significant to note that all of the commonly used deposit control agents precipitated under these conditions. In fact, two of these (HEDP and DPPA) precipitated under the most mild conditions used (400 ppm $Ca^{+2}$ and 25° C.).

In summary, the results of Tables II and III indicate that the first few homologs in the oligomeric phosphonate series possess enhanced stability toward precipitation with calcium compared to other commonly utilized materials.

TABLE II
STABILITY TOWARD PRECIPITATION WITH CALCIUM

| Treatment | T = 25° C. | T = 60° C. |
|---|---|---|
| Product 1 | clear | clear |
| Product 2 | clear | clear |
| Product 3 | clear | clear |
| Product 4 | clear | clear |
| Product 5 | clear | ppt |
| Product 6 | ppt | ppt |
| Product 7 | ppt | ppt |
| Product 8 | ppt | ppt |
| ATMP | clear | ppt |
| HEDP | ppt | ppt |
| DPPA | ppt | ppt |

Conditions:
20 ppm active treatment
400 ppm $Ca^{+2}$
pH = 9

TABLE III
STABILITY TOWARD PRECIPITATION WITH CALCIUM

| Treatment | T = 22° C. | T = 60° C. |
|---|---|---|
| Product 1 | clear | clear |
| Product 2 | clear | clear |
| Product 3 | clear | clear |
| Product 4 | clear | clear |
| Product 5 | clear | ppt |
| Product 6 | ppt | ppt |
| Product 7 | ppt | ppt |
| Product 8 | ppt | ppt |
| ATMP | clear | ppt |
| HEDP | ppt | ppt |
| DPPA | ppt | ppt |

Conditions:
20 ppm active treatment
1000 ppm $Ca^{+2}$
pH = 9

INHIBITION OF CRYSTALLIZATION

One method of evaluating deposit control activity of a material consists of measuring its ability to prevent bulk phase precipitation of a salt at conditions for which the salt would usually precipitate. It is additionally important to recognize that the material being evaluated is tested at "substoichiometric" concentrations. That is, typical molar ratios of precipitating cation to the material being evaluated are of the order of 20 to 1 up to 34,000 to 1. Consequently, stoichiometric sequestration is not the route through which bulk phase precipitation is prevented. This well-known phenomenon is also called "threshold" treatment and is widely practiced in water treatment technology for the prevention of scale (salt) deposits from forming on various surfaces.

In the results which follow several different salts commonly found in industrial water systems under various conditions have been selected as precipitants. The oligomeric phosphonates, as well as other utilized inhibitors, have been evaluated for their ability to prevent precipitation (i.e., inhibit crystallization) of these salts. The results are expressed as "Percent Inhibition", with negative values implying that flocculation may have taken place, zero values implying that as much precipitate formed in the treated as in the non-treated systems, and positive values implying that the stated percentage of the precipitate was prevented from forming.

CALCIUM SULFATE INHIBITION

The test procedure utilized to determine calcium sulfate inhibition was as follows: solutions containing $3 \times 10^{-2}$ M $CaSO_4$ were prepared from $CaCl_2 \cdot 2H_2O$ and $Na_2SO_4$. The pH was adjusted to 4, 8 or 11 for each series and 25 ml samples were added to test tubes. Treatments at the specified concentrations were added; the pH was readjusted if necessary; and the tubes were covered and placed in a water bath at 60° C. for a minimum of 14 hours. The solutions were cooled to room temperature and filtered through $0.2\mu$ filters. The soluble $Ca^{+2}$ was determined by titration with EDTA (ethylene diamine tetraacetic acid). The percent inhibition was calculated as follows:

$$\text{Percent Inhibition} = \frac{\text{ml titrant (treated)} - \text{ml titrant (control)}}{\text{ml titrant (maximum)} - \text{ml titrant (control)}} \times 100.$$

The results for the inhibition of 4080 ppm calcium sulfate precipitation at pH 4, 8 and 11 are given in Tables IV through VI at treatment levels of 0.5, 1.0, and 3.0 ppm. At these levels of calcium sulfate and treatment the molar ratios of calcium to treatment (monomer molecular weight basis) are of the order of 700 to 1 up to 34,000 to 1. The following conclusions are inferred from these results:

a. At pH 4, only the aminophosphonates possessed significant inhibition efficacy over the entire concentration range of 0.5 ppm–3.0 ppm. The oligomeric phosphonates showed inhibition efficacy for the first four members of the homologous series only at 3.0 ppm. The HEDP, a non-amino, non-oligomeric phosphonate, showed limited efficacy at all test conditions.

b. At pH 8, the first member of the oligomeric series, where $R_1$ and $R_2$ were —$CH_3$, performed as well as the aminophosphonates at all treatment levels. Treatments with lower homologous oligomers were substantially better than or equal to HEDP at the 3.0 ppm level. Similar to results at pH 4, there was a trend of decreased inhibition activity at a constant treatment level as the number of carbon atoms increased in the series.

c. At pH 11, the conclusions concerning efficacy were similar to those discussed at pH 8.

TABLE IV
CALCIUM SULFATE INHIBITION

| | Percent Inhibition | | |
|---|---|---|---|
| Treatment | 0.5 ppm | 1.0 ppm | 3.0 ppm |
| Product 1 | −1 | 2 | 71 |
| Product 2 | −2 | 6 | 50 |
| Product 3 | −3 | 0 | 33 |
| Product 4 | −1 | 0 | 48 |
| Product 6 | 0 | 0 | 10 |
| Product 7 | 0 | 0 | 4 |
| Product 8 | 0 | 0 | 2 |
| ATMP | 55 | 78 | 96 |
| HEDP | 1 | 5 | 21 |
| DPPA | 100 | 99 | 98 |

Conditions:
4080 ppm $CaSO_4$
20 hours equilibration time
pH = 4

TABLE V

CALCIUM SULFATE INHIBITION

| Treatment | Percent Inhibition | | |
|---|---|---|---|
| | 0.5 ppm | 1.0 ppm | 3.0 ppm |
| Product 1 | 91 | 91 | 100 |
| Product 2 | 24 | 83 | 93 |
| Product 3 | 11 | 76 | 93 |
| Product 4 | 15 | 86 | 99 |
| Product 7 | 7 | 6 | 25 |
| Product 8 | 4 | 4 | 18 |
| ATMP | 95 | 98 | 100 |
| HEDP | 13 | 25 | 87 |
| DPPA | 96 | 96 | 100 |

Conditions:
4080 ppm CaSO$_4$
60° C.
20 hours equilibration time
pH = 8

TABLE VI

CALCIUM SULFATE INHIBITION

| Treatment | Percent Inhibition | | |
|---|---|---|---|
| | 0.5 ppm | 1.0 ppm | 3.0 ppm |
| Product 1 | 62 | 87 | 91 |
| Product 2 | 50 | 84 | 87 |
| Product 3 | 57 | 94 | 85 |
| Product 4 | 67 | 88 | 86 |
| Product 6 | 14 | 26 | 33 |
| Product 7 | 6 | 9 | 18 |
| Product 8 | 6 | 8 | 25 |
| ATMP | 90 | 93 | 93 |
| HEDP | 37 | 75 | 91 |
| DPPA | 94 | 98 | 98 |

Conditions:
4080 ppm CaSO$_4$
60° C.
20 hours equilibration time
pH = 11

CALCIUM CARBONATE INHIBITION

The test procedure utilized to determine calcium carbonate inhibition was as follows:

System 1096 ppm Ca$^{++}$ as CaCO$_3$
1000 ppm CO$_3^{--}$ as CaCO$_3$
pH 9

Chemicals per Liter 3.25 g CaCl$_2$.2H$_2$O (Solution 1)
2.48 g Na$_2$CO$_3$.H$_2$O (Solution 2)
1 N NaOH
Calcium Indicator
1 N HCl

Procedure (1) 50 ml CaCl$_2$ pre-adjusted to pH 9
(2) Treatment
(3) 50 ml Na$_2$CO$_3$ pre-adjusted to pH 9
(4) Heat 5 hours at 70° C. H$_2$O bath, cool to room temperature
(5) Filter through 0.2μ filter (5 ml)
(6) Adjust to pH <1.0 with HCl
(7) Allow to stand overnight
(8) Dilute to 50 ml with deionized water
(9) Bring pH to 12.0 with NaOH
(10) Add Ca$^{+2}$ indicator
(11) Titrate with EDTA to purple-violet endpoint

Equipment

Brinkman PC 600 Colormeter
Fisher Acumet 230 pH Meter
Gelman filters in 6 head multi-filter
Kimax 50 milliliter pipet
Water bath capable of 100° C. range
Kimex beakers (250 ml)

Calculation

% inhibition =

$$\frac{\text{Soluble Ca}^{++}(\text{treated}) - \text{Soluble Ca}^{++}(\text{control})}{\text{Soluble Ca}^{++}(\text{theoretical maximum}) - \text{Soluble Ca}^{++}(\text{control})} \times 100$$

The results for the inhibition of 1038 ppm calcium carbonate precipitation at pH 9 and at treatment levels of 5, 10 and 15 ppm are given in Table VII. The following conclusions are inferred from these results:

a. The activity of the homologous series decreased as the chain length increased for $R_1$ and $R_2$.

b. For any given treatment, the percent inhibition was relatively independent of concentration in the range of 5–15 ppm.

c. The first four members of the homologous series possessed at least equivalent activity as inhibitors to the amino phosphonates. Of all these, the oligomer with R=C$_2$H$_5$ (Product 3) appeared to be somewhat more efficacious than the others, especially at the higher treatment levels.

TABLE VII

CALCIUM CARBONATE INHIBITION

| Treatment | Percent Inhibition | | |
|---|---|---|---|
| | 5 ppm | 10 ppm | 15 ppm |
| Product 1 | 55 | 28 | 53 |
| Product 2 | 50 | 54 | 60 |
| Product 3 | 63 | 69 | 89 |
| Product 4 | 54 | 47 | 48 |
| Product 7 | 22 | 23 | 23 |
| Product 8 | 4 | 8 | 28 |
| ATMP | 39 | 41 | 59 |
| HEDP | 67 | 56 | 47 |
| DPPA | 48 | 44 | 44 |

Conditions:
1038 ppm CaCO$_3$
70° C.
5 hours equilibration time
pH = 9

The results of the calcium sulfate and calcium carbonate testing indicated quite clearly that when x was 4 or less significant efficacy was attained.

CALCIUM PHOSPHATE INHIBITION

Eight samples of the oligomeric phosphonates of the present invention were tested for efficacy as regards calcium phosphate crystallization inhibition and deposition control. Members of this series represented compounds having increasing alkyl lengths as represented by "x" of the generic formulae. "x" in these compounds were 1 through 11.

The test procedure utilized was as follows:

CHEMICALS (A) 0.4482 g Na$_2$HPO$_4$/liter deionized H$_2$O
(B) 36.76 g CaCl$_2$2H$_2$O/liter deionized H$_2$O

PROCEDURE (1) To 1800 ml deionized water, add 20 ml solution (B) followed by 2 drops concentrated HCl.
(2) Add 40 ml solution (A).
(3) Bring volume to 2000 ml with deionized water.
(4) Place 100 ml aliquot of solution (3) in 4 oz. glass bottle.
(5) Add 0.5 ml or 1 ml of 0.1% treatment solution and adjust pH.
(6) Place bottle in water bath and allow to equilibrate 17 hours.
(7) Remove sample and filter thru 0.2 micron millipore filter (hot).
(8) Cool to room temperature.
(9) To 5 mls filtrate, add 10 mls molybdate reagent, 1 dipper of stannous reagent.
(10) Swirl 1 minute, pour into cuvette and take absorbance using Leitz photometer after 1 minute equilibration.

CALCULATION $$\% \text{ Inhibition} = \frac{\text{ppm PO}_4 \text{ treated}^{(1)} - \text{ppm PO}_4 \text{ Control}^{(1)}}{\text{ppm PO}_4 \text{ stock solution}^{(1)} - \text{ppm PO}_4 \text{ Control}^{(1)}} \times 100$$

TABLE VIII

CALCIUM ORTHO PHOSPHATE INHIBITION

| Treatment | Percent Inhibition | | | |
|---|---|---|---|---|
| | 1 ppm | 5 ppm | 10 ppm | 20 ppm |
| Product 1 | 14.3 | 21.4 | 25.9 | 54.5 |
| Product 2 | 20.6 | 33.5 | 36.9 | 59.4 |
| Product 3 | 13.4 | 40.2 | 46.4 | 65.2 |
| Product 4 | 18.0 | 34.3 | 38.3 | 68.3 |
| Product 5 | 15.8 | 32.3 | 35.2 | 49.7 |
| Product 6 | 2.6 | 27.8 | 36.4 | 44.3 |
| Product 7 | 3.1 | 5.2 | 20.1 | 42.4 |
| Product 8 | 2.9 | 7.7 | 18.0 | 57.0 |
| ATMP | (6.3) | (22.3) | (26.8) | (37.5) |
| ATMP | — | 23.5 | 28.3 | 40.3 |
| HEDP | 8.9 | 13.4 | 8.9 | 8.0 |

As the results indicate, all of the oligomeric compounds tested were quite effective in controlling calcium ortho phosphate formation and deposition.

DISPERSION

A second method of evaluating the deposit control activity of a material consists of measuring its ability to prevent particles from settling from low solids suspensions (<1%). The basis of this evaluation rests in the fact that some deposits are formed by the subsidence of particles. This is especially true for all systems where low flow rates or low turbulence may exist. Since the rate of subsidence is a function of particle size and particle density (relative to that of the continuous phase), if particles can be kept small enough and agglomeration prevented (dispersion effected), then there will be a decrease in the rate of deposit formation.

FERRIC HYDROXIDE DISPERSION

The test procedure utilized to determine ferric hydroxide dispersion was as follows: A solution containing 20 ppm $Fe^{+3}$ was prepared from 0.1447 g $(Fe(NO_3)_3 \cdot 9H_2O$ plus 1 liter $H_2O$ by mixing in a blender. The pH was adjusted to 8 at low speed for about 45 minutes. Samples 25 ml in volume were removed and the various treatments were added. The pH was readjusted to 8 if necessary. The samples were mixed well, covered, and allowed to stand overnight. Visual observations were made to determine flocculation or dispersion in the samples.

The results for ferric hydroxide dispersion (20 ppm $Fe^{+3}$) at pH 8 are given in Table IX. For this low solids system, visual observations were made as to whether the ferric hydroxide remained dispersed or flocculated and settled to the bottom. This method, while qualitative, provides an excellent and reproducible evaluation of potential dispersants. The tests were conducted as a function of dispersant concentration from 0.5 to 3.0 ppm. In this concentration range the molar ratios of iron to dispersant varied from approximately 9 to 1 up to 400 to 1. Consequently, similar to crystallization inhibition, simple complexation of iron cations was not sufficient to effect dispersion.

From Table IX it was concluded that among the phosphonates (both the oligomers and the aminophosphonates) dispersion was not effected until the concentration reached 3.0 ppm. At this level, the oligomers were equivalent to the aminophosphonates as dispersants. Although the oligomer where "x" was equal to 2 to 5 were effective at 3 ppm, the oligomer where "x" was 1 was not effective. It would be expected, however, that if the dosage rates of the oligomer were increased, effective ferric hydroxide dispersion would be obtained.

TABLE IX

FERRIC HYDROXIDE DISPERSION

| Treatment | 0.5 ppm | 1.0 ppm | 3.0 ppm |
|---|---|---|---|
| Product 1 | flocculated | flocculated | flocculated |
| Product 2 | " | " | dispersed |
| Product 3 | " | " | " |
| Product 4 | " | " | " |
| Product 5 | " | " | " |
| Product 7 | " | " | flocculated |
| ATMP | " | " | dispersed |
| HEDP | " | " | " |
| DPPA | " | dispersed | " |

Conditions:
20 ppm $Fe^{+3}$
25° C.
pH = 8

CALCIUM OLEATE DISPERSION

The test procedure utilized to determine calcium oleate dispersions was as follows:

SYSTEM 10 ppm $Ca^{++}$
50 ppm Oleate
pH 9

SOLUTIONS $1 \times 10^{-1}$ M $CaCl_2$
1% Na Oleate
0.1 N NaOH

PROCEDURE (1) 99.25 ml deionized $H_2O$
(2) 0.25 ml $1 \times 10^{-1}$ $CaCl_2$
(3) Treatment
(4) Pre-adjust pH to 9.2
(5) 0.50 ml Na Oleate (1%—pH 10)
(6) Transfer to Leitz for 30 minutes' % T The results for the dispersion of calcium oleate at pH 9 are given in Table X. Calcium oleate is an organic deposit which is a major component of "pitch" in pulping and papermaking. If calcium oleate can be dispersed, it is generally agreed that pitch itself can be dispersed. For this system, the amount of light transmitted through a solution containing the interacting calcium and oleate was taken to be proportional to the amount of insoluble calcium oleate formed. That is, the less light transmitted (low percent transmittance), the greater the amount of insoluble material formed. Percent transmittance values that were larger than the control values were then interpreted to have less insoluble material and hence increased solubility. This increase in solubility is believed to be a measure of the ability to prevent deposit formation. Accordingly, the following conclusions are inferred from Table X:

a. At the test conditions, all of the oligomeric phosphonates (except where R=CH$_3$) were capable of increasing the solubility of calcium oleate; however, it is believed that with increased dosages this derivative would also function as the other oligomers did.

b. ATMP showed the least ability to increase the solubility, while HEDP possessed the greatest ability.

TABLE X
CALCIUM OLEATE DISPERSION

| Treatment | % Transmittance |
|---|---|
| None | 64 |
| Product 1 | 63 |
| Product 2 | 83 |
| Product 3 | 92 |
| Product 4 | 87 |
| Product 6 | 96 |
| Product 7 | 82 |
| Product 8 | 80 |
| ATMP | 56 |
| HEDP | 98 |
| DPPA | 88 |

Conditions:
10 ppm Ca$^{+2}$
50 ppm Oleate
15 ppm treatment
pH = 9

From the foregoing showings then, it is quite apparent that the oligomers of the present invention not only have the qualities necessary for water treatment applications but are also as effective as, and in many cases more effective than, the commercially used phosphonic acid derivatives.

We claim:

1. A method of dispersing iron hydroxide particulate matter contained in an aqueous medium, and thereby controlling the settling thereof on the structural parts of the system bearing said medium, which comprises adding to said system an effective amount for the purpose of a water soluble, chlorine-resistant, high calcium tolerance phosphonate having the formula

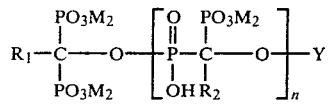

wherein R$_1$ and R$_2$ each represent a group having the formula C$_x$H$_{2x+1}$; x is from 1 to and including 13; Y is (i) a mixture of

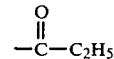

with H and/or

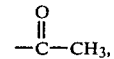

and (ii) C$_x$H$_{2x+1}$ where x is as above defined; M is a water soluble cation; and n is 1 or greater.

2. A method according to claim 1, wherein the amount added is from about 0.5 to about 600 parts per million parts of said medium.

3. A method according to claim 2, wherein n is from about 1 to about 16.

4. A method according to claim 3, wherein the system is a cooling water system.

5. A method according to claim 3, wherein the system is a gas scrubber system.

6. A method according to claim 1, wherein the phosphonate is added to said system in an amount ranging from 0.5 to 100 parts per million parts of said aqueous medium.

7. A method according to claim 6, wherein n is from about 1 to about 16.

8. A method according to claim 7, wherein the system is a cooling water system.

9. A method according to claim 7, wherein the system is a gas scrubber system.

10. A method according to claim 1, wherein R$_1$ and R$_2$ are C$_2$H$_5$, Y is hydrogen and n is from about 1 to about 16.

11. A method according to claim 10, wherein the phosphonate is added to said system in an amount ranging from 0.5 to 600 parts per million parts of said aqueous medium.

12. A method according to claim 11, wherein the system is a cooling water system.

13. A method according to claim 11, wherein the system is a gas scrubber system.

* * * * *